Dec. 29, 1925.

W. W. BRATTON

DIRIGIBLE HEADLIGHT

Filed May 20, 1925

William Wiley Bratton INVENTOR

BY Victor J. Evans ATTORNEY

Dec. 29, 1925.  
W. W. BRATTON  
DIRIGIBLE HEADLIGHT  
Filed May 20, 1925
1,567,907
2 Sheets—Sheet 2
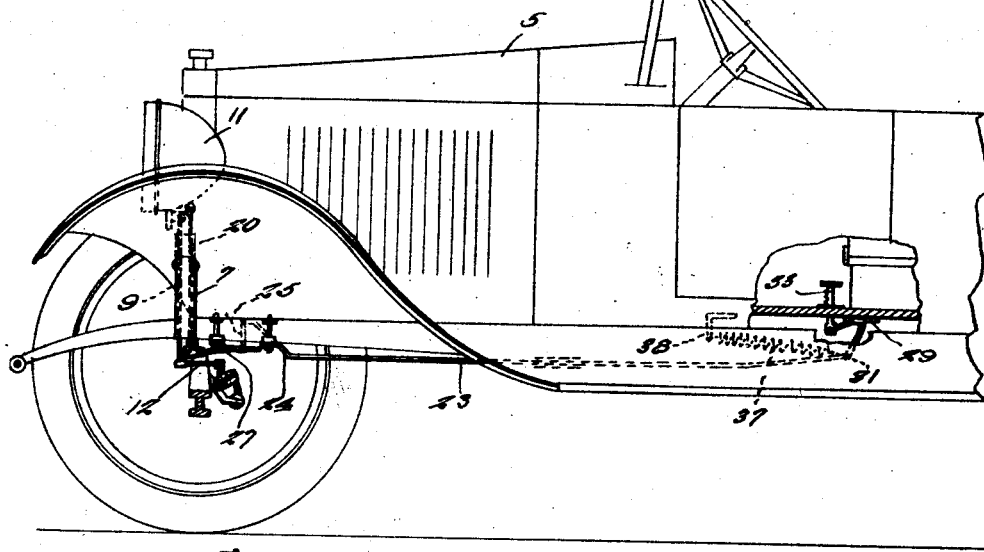
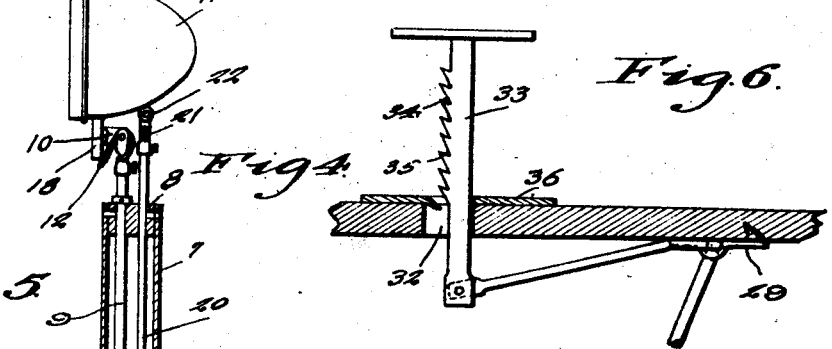
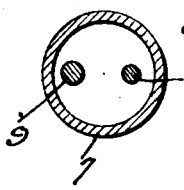
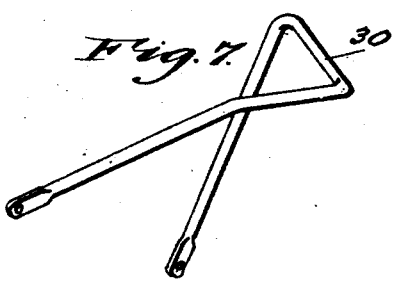
William Wiley Bratton, INVENTOR Patented Dec. 29, 1925.

1,567,907

UNITED STATES PATENT OFFICE.

WILLIAM WILEY BRATTON, OF SLAB FORK, WEST VIRGINIA.

DIRIGIBLE HEADLIGHT.

Application filed May 20, 1925. Serial No. 31,674.

*To all whom it may concern:*

Be it known that I, WILLIAM WILEY BRATTON, a citizen of the United States, residing at Slab Fork, in the county of Raleigh and State of West Virginia, have invented new and useful Improvements in Dirigible Headlights, of which the following is a specification.

This invention relates to dirigible headlights for automobiles and its principal object is to provide an automatic dirigible light which can be manually operated to dispose the lights at any desired angle with respect to the horizontal so that the light rays will not be directed to the eyes of a driver of an approaching automobile.

The invention also contemplates an automatic dirigible headlight together with manually operable means within reach of the driver whereby the lights can be swung about a horizontal axis to direct the rays onto the ground.

With the preceding and other objects and advantages in mind, the invention consists in the novel combination of elements, construction, arrangement of parts and operations, to be hereinafter specifically referred to, claimed and illustrated in the accompanying drawings, wherein:

Figure 2 is a side view of the same having parts broken away.

Figure 4 is a vertical section on line 4—4 of Figure 1.

Figure 5 is a horizontal section on line 5—5 of Figure 4.

Figure 6 is a detail view of the foot actuated means for tilting the headlights.

Figure 7 is a perspective of one of the elements embodied in the invention, and

Figure 1:
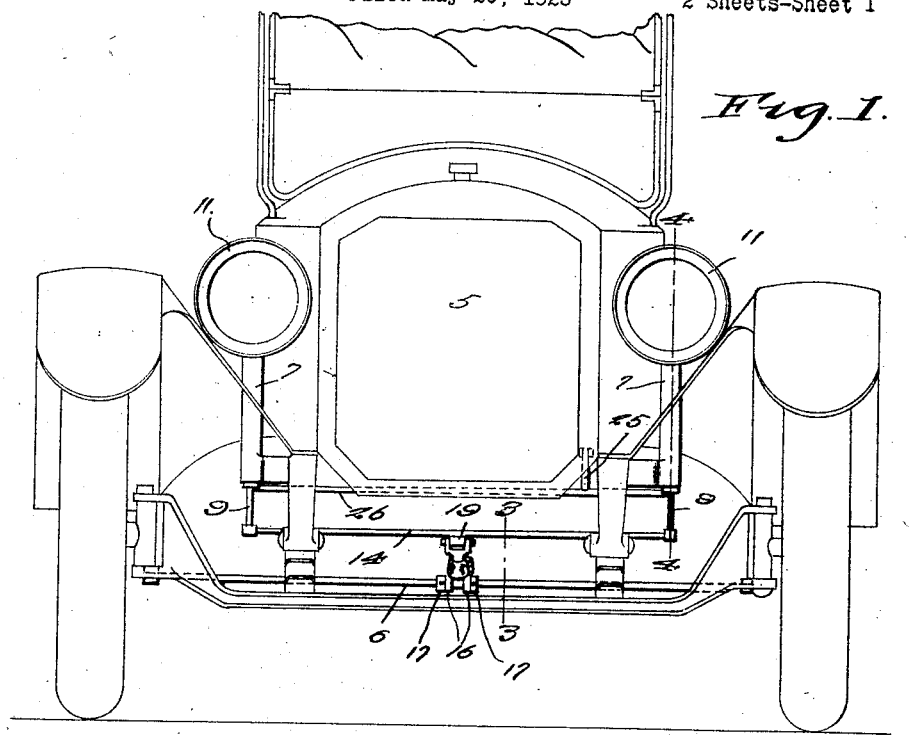
Figure 1 is a fragmentary front elevation of an automobile equipped with the present invention.

Referring to the drawings in detail wherein corresponding characters of reference denote corresponding parts throughout the several views, the numeral 5 designates an automobile including the usual transversely shiftable steering gear rod 6. Mounted upon the opposite sides of the automobile at the front thereof is a pair of vertically arranged tubular standards 7 having bearing elements 8 in their ends. Extending through each of these standards 7 and rotatable in the bearing elements 8 are revoluble lamp supports 9, the latter having their upper ends pivoted to V-shaped lugs 10 formed upon the lower end of a pair of rotatable and oscillatory head lights 11. Leaf springs 12 are engaged about the upper ends of the rotatable lamp support and with the lugs 10 and serve to normally urge the head lights to a horizontal position. Rearwardly extending arms 12' are fixed to the lower ends of the revoluble lamp support and operatively connected with the ends of these arms is a transversely movable lamp actuating or rotating rod 14.

Figure 3:
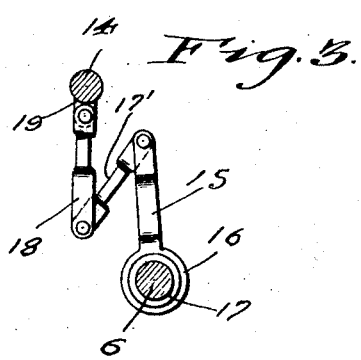
Figure 3 is a sectional view on line 3—3 of Figure 1.

In order to shift the rod 14 incident to the shifting of the transversely shiftable rod 6 I provide an operative connection shown in Figure 3. This operative connection comprises an upstanding arm 15 formed with a collar 16 at its lower end which is received on the rod 6 and held against movement in opposite directions by collars 17 arranged on opposite sides of the first mentioned collar. A normally angularly disposed link 17' is connected to the upper end of the upstanding arm 15. A similar link 18 which is normally disposed in vertical relation with the link 17' has its lower end connected to the lower end of the link 17'. The upper end of the link 18 is bifurcated and is pivoted to a boss 19 formed upon the rod 14 at a point centrally of its ends. It will be observed that as the rod 6 is shifted incident to the steering of the automobile the arm 15 is correspondingly shifted laterally and through the links 17' and 18 shift the rod 14 in a corresponding direction to rotate the lamp support. It is pointed out that the reason I provide the pivotal connection between the upstanding arm 15 and the rod 14 is to compensate for rebound of the automobile incident to the same traversing a rough road.

Figure 8:
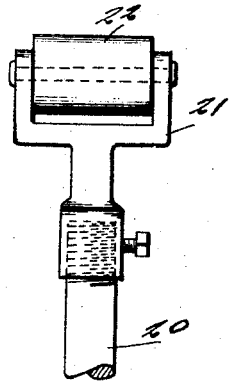
Figure 8 is a detail view of the light engaging roller.

The invention also contemplates manually operable means for oscillating the headlights 11 so that the light rays will be directed towards the ground upon the approach of an automobile coming towards the light. This means comprises a vertically movable rod 20 passing through the bearing elements 8 of each of the tubular lamp supports and carries a bracket 21 at its upper end and as shown in Figure 8 is substantially Y-shaped. A roller 22 is journaled between the parallel part of each of these brackets 21 and normally engages the underface of each of the lamps 11 at a point rearwardly of the pivotal connection of the V-shaped lugs 10 with the revoluble lamp supporting rods 9.

Arranged beneath the body of the automobile 5 and extending longitudinally thereof is an actuating rod 23 having its forward end bent at an oblique angle with respect to the horizontal as at 24 and operatively connected with a vertically extending arm 25 formed on a rock shaft 26, the latter being journaled at a point rearwardly of the tubular standard 7. This rock shaft 26 is formed with forwardly extending parallel arms 27 which have their forward ends pivotally and slidably connected with the lower ends of the vertically movable rod 20 as at 28.

Journaled in a bearing 29 secured to the underface of the floor of the automobile as shown in Figures 2 and 6, is a crank shaft 30 having one of its arms pivotally connected as at 31 to the inner end of the rod 23. Vertically movable through an opening 32 in the automobile floor is a foot engaging lever 33 having its lower end pivotally connected to the other end of the crank shaft 30. This vertically movable lever 33 is provided with serrations or teeth 34 engageable with a detent 35 formed on a plate 36 secured to the automobile floor. As this lever 33 is depressed the teeth 34 engage the detent 35 and lock the lever in depressed position and actuates the parts above set forth to tilt or oscillate the lights. When it is desired to disengage the teeth 34 from the detent 35 the lever 33 is rocked rearwardly and is returned to normal position by means of a contractile spring 37 having one end connected to one of the arms of the bell crank 30 and its operative end anchored as at 38 to the automobile body.

While I have shown and described the preferred embodiment of the invention, I desire to have it understood that such changes may be made in the form, construction, arrangement of parts and operations, as will not depart from the spirit of the invention or the scope of the subjoined claim.

What is claimed is:—

The combination with an automobile including a transversely shiftable steering gear rod, and a pair of rotatable lamp supports, of a transversely shiftable actuating rod operatively connected with a lamp support, an upstanding arm on the transversely shiftable steering gear rod, an angularly disposed link pivotally connected with the upper end of the arm, a boss on the actuating rod, a normally vertically disposed lever pivoted to the boss, and the lower end of the link, such link and lever affording operative connections between the transversely shiftable steering gear rod and transversely movable actuating rod and permitting movement with respect to the movement of the body of the vehicle with respect to the frame without breakage.

In testimony whereof I affix my signature.

WILLIAM WILEY BRATTON.